Figure 1:
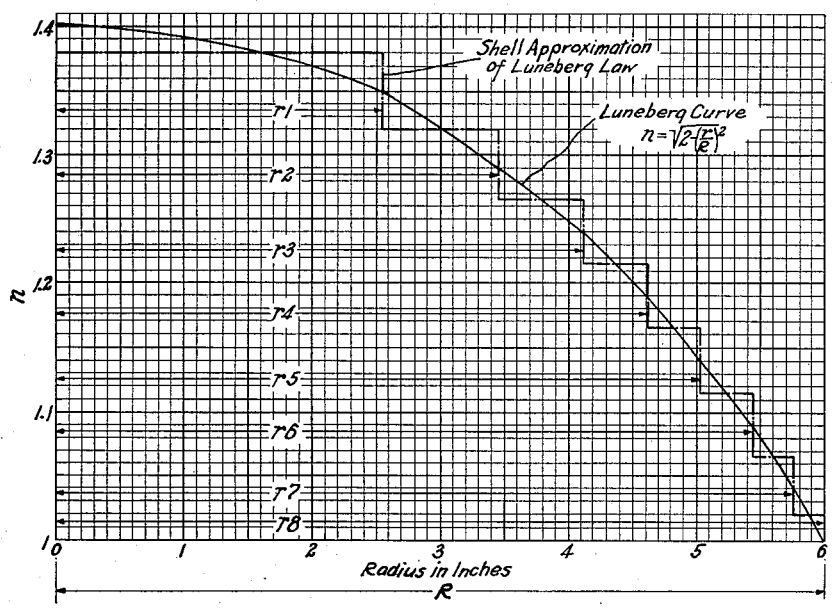

Aug. 26, 1958

G. P. ROBINSON, JR 2,849,713

SPHERICAL MICROWAVE LENS

Filed Dec. 1, 1955

2 Sheets-Sheet 1

INVENTOR
Glen P. Robinson, Jr.
BY
ATTORNEY

Aug. 26, 1958 G. P. ROBINSON, JR 2,849,713
SPHERICAL MICROWAVE LENS
Filed Dec. 1, 1955 2 Sheets-Sheet 2
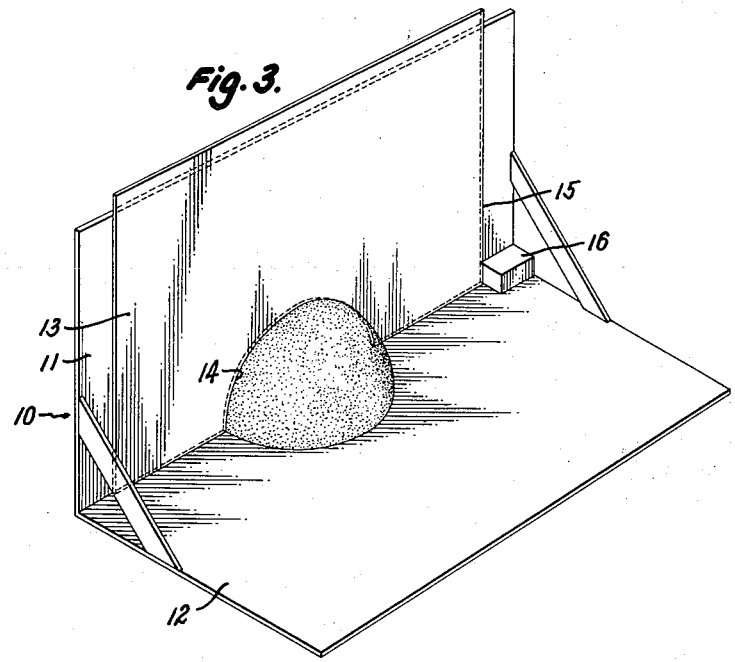
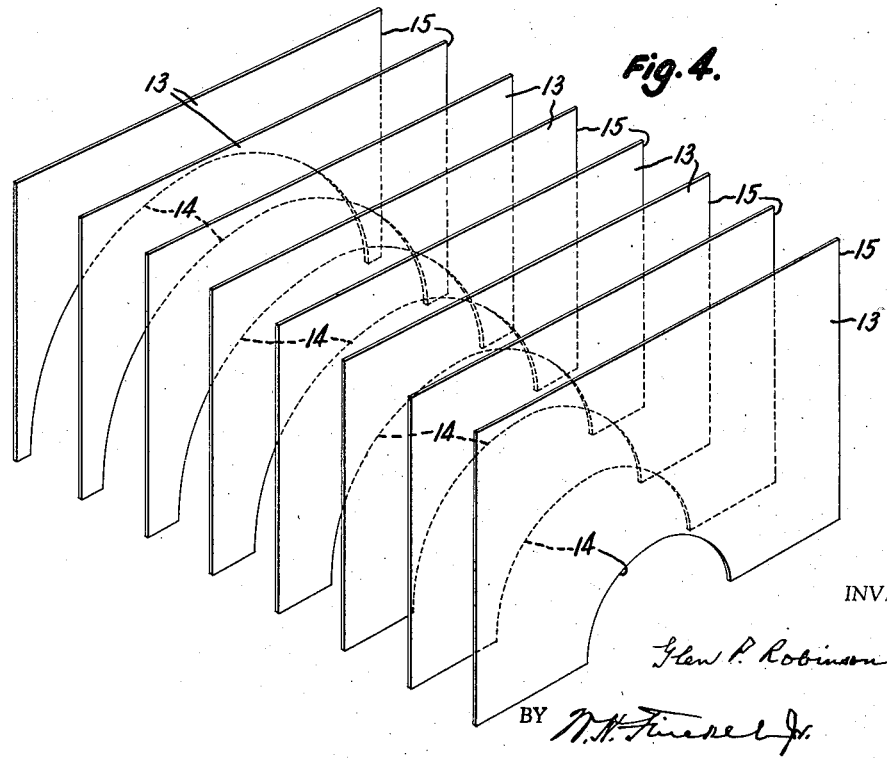
INVENTOR
Glen P. Robinson, Jr.
BY
ATTORNEY

United States Patent Office 2,849,713
Patented Aug. 26, 1958

2,849,713
SPHERICAL MICROWAVE LENS

Glen P. Robinson, Jr., Atlanta, Ga., assignor to Scientific-Atlanta, Inc., a corporation of Georgia Application December 1, 1955, Serial No. 550,246

17 Claims. (Cl. 343—910)

This invention relates to devices for focusing radio waves, and it has special reference to a spherical dielectric lens having the characteristics of the "Luneberg Lens" described by R. K. Luneberg in "Mathematical Theory of Optics," Brown University Advanced Instruction and Research in Mechanics, Providence, Rhode Island, Summer of 1944, and the method of fabricating such a lens.

The primary object of the invention is to provide a focusing device of lens character which will focus radio waves for incident plane phase fronts lying in any plane, or, conversely, will collimate radio waves emitting from any point source on the surface of the lens into plane phase fronts. In other words, the object is to provide a lens device which will function reciprocally, so that energy from a plane wave or phase front will be focused to a point on the lens surface, or energy from a point on such surface will be collimated in a plane wave or phase front.

Another object is to make possible the provision of a dielectric lens constructed in the form of a true sphere composed of a plurality of concentric layers of dielectric material wherein the index-of-refraction $n$ of these layers, stepwise, closely approximates, and answers for practical purposes, the "Luneberg" equation $$n = \sqrt{2 - \left(\frac{r}{R}\right)^2}$$

where $R$ is the maximum radius of the sphere and $r$ is the radius within the sphere to the particular layer; or, as it is commonly stated, $n=\sqrt{2-R^2}$, where $R$ is the ratio of the radial distance to a point in the sphere to the maximum radial distance.

A further object is to provide a lens of this layer type in which the layers are composed of a moldable plastic, their radii of curvature are common to the center of the sphere and their indices of refraction are controlled in accordance with the said "Luneberg" equation by the composition of the moldable plastic.

Still another object of the invention is to provide a lens of this type in which a stable expanded dielectric plastic substance of relatively low dielectric constant is used as the matrix for the production of the layers, and the index-of-refraction, or dielectric constant, of the several layers is appropriately determined by the addition, to the separate batches of this plastic for the several layers, of predetermined quantities of dispersible material of high dielectric constant.

A still further object is to provide, in a practical commercial embodiment, a spherical microwave lens following in its physical characteristics the "Luneberg" equation and having the property of being able to collimate in any direction, whereby a plane wave intercepted by the lens will be focused to a point on the surface of the lens diametrically opposite the point of first entrance within the lens, thus making scanning, searching and tracking with the lens possible by movement only of the primary source (feed horn) rather than the full assembly, and consequently furnishing a lens which will be outstandingly useful as a rapid scanning or rapid tracking radar antenna since the inertia of the moving parts is greatly reduced.

Another object of the invention is to provide a method of producing a practical physical embodiment of a spherical microwave lens according to the "Luneberg" equation.

With these and allied objects in view, as will be apparent from the following description, the invention is directed to a device for focusing radio waves from incident plane phase fronts in any plane, comprising a spherical body symmetrical with respect to its center and composed of concentric layers of dielectric material formed in such a manner that the indices-of-refraction of these layers stepwise practically approximate the "Luneberg" equation $$n = \sqrt{2 - \left(\frac{r}{R}\right)^2}$$

where $R$ is the maximum radius of the sphere and $r$ is the radius within the sphere to the particular layer, the said dielectric material being composed of a mixture of an expanded plastic material, such as ground polystyrene foam, of relatively low dielectric constant, a dispersible dielectric material such as titanium dioxide or lead chloride of relatively high dielectric constant, and a binder, the dielectric constants or indices-of-refraction of said materials being known, and the invention comprises, further, the method of constructing a practical embodiment of such a spherical body, all as will be explained hereinafter more fully and finally claimed.

Figure 2:
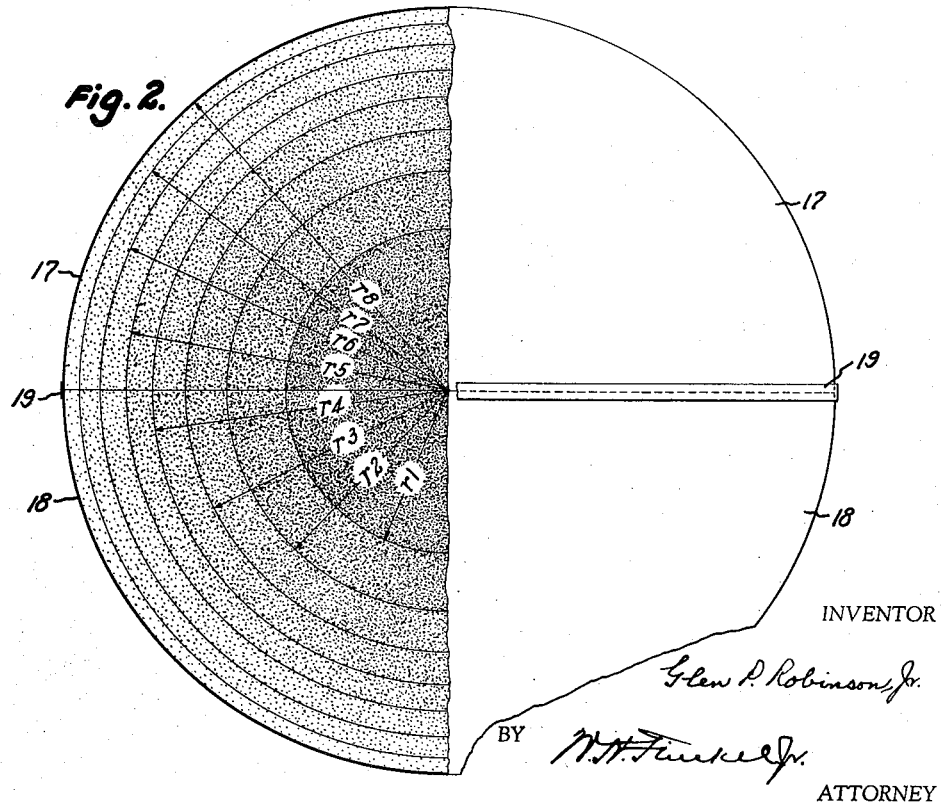

In the accompanying drawings illustrating the invention, in the several figures of which like parts are similarly designated, Fig. 1 is a graph illustrating the values of radii and refractive index of an eight-shell lens of twelve inch diameter embodying the invention, Fig. 2 is a schematic view, upon a reduced scale, showing, in fragmentary form, a partial diametrical section of a spherical microwave lens of eight shell form embodying physical properties in accordance with the invention and constructed by the method of the invention, Fig. 3 is a schematic view, upon a further reduced scale, illustrating the method of forming a quadrant of the eight shell spherical lens of the invention shown in Fig. 2, and Fig. 4 is a composite view of the eight templates appropriate for the production of the eight shell lens of Fig. 2.

In accordance with the "Luneberg" theory it can be shown that for a sphere of refractive material in which the index of refraction varies from 1 to $\sqrt{2}$ following the formula $n=\sqrt{2-R^2}$, where $R$ is the ratio of the radial distance from the center of the sphere to a point therein under consideration to the radius of the sphere, a distant object will be imaged upon the surface of the sphere, and, as hereinbefore pointed out, it is the primary object of this invention to provide a sphere which has such structural and physical characteristics that, although not strictly responsive to the values to be obtained by the foregoing formula, it will be practically effective, when used, as providing a reliably close approximation of such values.

Having in mind the fact that the effective refractive index of a material is inversely proportional to the velocity of propagation of electromagnetic wave energy through the material, $$n = \frac{c}{v}$$

where $n$ is the refractive index, $v$ is the velocity of propagation through the material and $c$ is the velocity of propagation through space, the spherical lens of the invention is formed of a plurality of globular layers or shells each of which has a different index-of-refraction, and possibly also of structural thickness, but all of which respond in their individual characteristics of index of refraction to the "Luneberg" equation which may be appropriately given as $$n = \sqrt{2 - \left(\frac{r}{R}\right)^2}$$

where $R$ is the maximum radius of the sphere, and $r$ is the radius to the spherical surface defining the separation between a certain layer and that next radially outwardly of it.

Inasmuch as, when working with low loss material, its index-of-refraction and dielectric constant bear a direct relationship in that the index-of-refraction is equal to the square root of the dielectric constant, the values for $n$ of the several layers of the sphere may be considered as the square roots of their respective dielectric constants and the composition of the material from which they are constructed compounded in accordance therewith.

In the practice of the invention it has been found that the several layers for producing the spherical lens may be effectively formed from a stable expanded dielectric plastic substance, the relatively low dielectric constant of which is known, and that this substance, used as a matrix or base may have its dielectric constant varied so as to form materials with dielectric constants proper for the several layers by the incorporation of a dispersible dielectric material having a known dielectric constant higher than that of the matrix material.

As a mixture of two dielectric materials has a dielectric constant intermediate those of the two materials, mixtures of the materials just broadly identified are readily controlled for the purpose of conforming to the range of dielectric constant required for a "Luneberg" lens, namely 1 to 2, or to the range of index-of-refraction from 1 to $\sqrt{2}$.

Specifically, it has been found that foamed polystyrene dust, or ground polystyrene foam, may be effectively used as the stable expanded dielectric plastic substance for the matrix or base, and either titanium dioxide or lead chloride may be used as the dispersible dielectric material, a binder, preferably a polyvinyl acetate emulsion, being added.

The proportions of these ingredients for a given layer of the sphere adequate to provide therein a predetermined index-of-refraction will be arrived at in accordance with the formula:

$$n = 1 + K_a D_a + K_b D_b + K_c D_c \quad \text{(Equation 1)}$$

where $K_a = 0.034$ cu. in./gm. for the polystyrene component; $D_a =$ density of the polystyrene component in grams per cubic inch; $K_b = 0.0385$ cu. in./gm. for polyvinyl acetate; $D_b =$ density of the solid polyvinyl acetate; $K_c = 0.0915$ cu. in./gm. for $TiO_2$, or 0.030 cu. in./gm. for $PbCl_2$; and $D_c =$ density of $TiO_2$ or $PbCl_2$.

In practice is was found that 0.65 gm. of polystyrene dust, combined with 0.53 gm. solid weight of a 24% solution of polyvinyl acetate, further combined with the required weight of $TiO_2$, to produce a 1 cu. in. volume of the resultant material, gave most desirable mechanical properties.

Having reference particularly to titanium dioxide as the dispersible additive, it will be noted that, in order for the individual plastic mixtures for the several layers to have desired predetermined dielectric constants from the center of the sphere outward to follow the requirements of the "Luneberg" equation, the relative density of $TiO_2$ to the volume of the respective layer will be decreased in each layer progressively outwardly, and in actual practice it has been found that the thickness of the layers concomitantly decreases.

Also, it is desirable to have the ratio of index-of-refraction between adjacent shells constant. For example, if the desired spherical lens has a radius of 6″ and, for best results is to be divided into eight layers or shells with the dielectric constant or index-of-refraction of the center shell 1.41 ($\sqrt{2}$ in the range 1 to $\sqrt{2}$), a number, which is a constant, will be found to serve as a multiplier so that when the index of refraction 1.41 of the center shell is multiplied by it the result will give the index-of-refraction of the second outward, or adjacent, shell; and when this second index-of-refraction is in turn multiplied by such constant the index-of-refraction of the third shell will be ascertained, and so on outward for the eight shells until the value $n = 1$ is derived as the index of refraction of the eighth, or outermost, shell.

Conversely, and for convenience in actual practice, the index-of-refraction $n$ for each of the predetermined eight shells is determined in this way, and then, by using the "Luneberg" equation, I solve for $r$ to obtain the radius for each of the eight shells.

As representative, a formula for arriving at the requirements for a lens in accordance with the invention may be given as follows:

In approximating a true "Luneberg" lens by a series of concentric dielectric spherical layers, it has been found desirable to have the ratio of the indices-of-refraction, $n$, of adjacent shells constant. The method for calculating this constant ratio is as follows:

Let:

$N =$ the desired number of shells or layers,
$n =$ index-of-refraction,
$k =$ ratio of $n$ between adjacent shells or layers, and
$j =$ any shell or layer number between O and N.

Following the Luneberg equation $$n = \sqrt{2 - \left(\frac{r}{R}\right)^2}$$

when $$\frac{r}{R} = 0, \quad n = 1.414$$

and when $$\frac{r}{R} = 1, \quad n = 1$$

The subscript is used to indicate the number of the shell or layer:

$$n_0 = 1.414$$
$$n_1 = k n_0$$
$$n_2 = k n_1 = k^2 n_0$$

or $$n_j = k^j n_0$$

Now for N shells or layers, the outside shell must have $n = 1$, or $$n_N = k^N n_0 = 1$$

As hereinbefore stated, for a 12 inch diameter lens 8 shells or layers are found to be appropriate. The ratio of $n$ between shells or layers is thus:

$$k = \left(\frac{1}{n_0}\right)^{1/8} = \left(\frac{1}{1.414}\right)^{1/8} = 0.958$$

The $n$ for each shell or layer is computed and tabulated in Table I.

The indices-of-refraction that have been calculated are used now to find the radii of individual shells or layers. These $r$'s are calculated by substituting $n$ into the Luneberg equation, just above identified, which may be rewritten as $$\frac{r}{R} = \sqrt{2 - n^2}$$

The radii of each shell or layer for $R=6''$ is tabulated in Table I.

The indices-of-refraction computed above are used to compute the radii of the shells or layers. The actual $n$ of a shell or layer should be an average of the $n$'s at each boundary as seen in Fig. 1. These values are tabulated in Col. 4 of the table.

As stated, the material used to fabricate a shell or layer may be considered as a mixture of foamed polystyrene ground into a sawdust, a high dielectric constant material such as titanium dioxide, and a suitable binder to bind the mixture rigidly. It was found experimentally that the index-of-refraction of this mixture is, as given by Equation 1, $$n = 1 + (0.034)D_a + (0.0385)D_b + (0.0915)D_c$$

where the D's are the densities of the foamed polystyrene dust, polyvinyl acetate binder, and titanium dioxide respectively. These densities are given in grams per cubic inch. It was further found experimentally that the density of the dust, $D_a$, and binder, $D_b$, should be 0.65 gm./cu. in. and 0.53 gm./cu. in. respectively, and should be held constant for all shells or layers. Thus the index-of-refraction of the mixture is controlled simply by controlling the density of the titanium dioxide. The density of the binder is the density of solid component polyvinylacetate. This binder is a 24% emulsion in water, consequently the density of the liquid is 2.20 gm./cu. in. which after drying will give a density of 0.53 gm./cu. in. (Note.—These densities are defined as the weight of the individual components divided by the volume of the resultant mixture.)

Referring again to Table I, the volumes of the several shells or layers are computed and tabulated in Col. 5. Now the densities of the foam and binder given above are used to find the weight of each to be used in each shell or layer. For example, shell or layer No. 1 has a volume of 69.5 cu. in.

$$\text{Wt. of foam} = 0.65 \frac{\text{gm.}}{\text{cu. in.}} \times 69.5 \text{ cu. in.} = 45 \text{ gm.}$$

$$\text{Wt. of liquid binder} = 2.20 \frac{\text{gm.}}{\text{cu. in.}} \times 69.5 \text{ cu. in.} = 153 \text{ gm.}$$

These results are tabulated in Cols. 6 and 7.

Now, the required amount of titanium dioxide to add to these mixtures to achieve the desired $n$ must be found. Referring again to Equation 1 as above rewritten with the chosen constant values for $D_a$ and $D_b$ substituted.

$$n = 1 + (0.034) \times 0.65 + (0.0385) \times 0.53 + (0.0915) \times D_c$$
(Equation 2)

This may be revised to read $$\text{Weight of TiO}_2 = \left(\frac{n - 1.0425}{0.0915}\right) \times (\text{volume of shell or layer})$$

The first shell or layer is calculated as follows:

$$\text{Wt. of TiO}_2 = \left(\frac{1.38 - 1.04}{0.0915}\right) \times 69.5 = 258 \text{ gm.}$$

These computations are made for all shells or layers and are tabulated in Col. 8 of Table I. It can be seen that the last, or outer, shell or layer has too high an $n$ even with no $TiO_2$. This is compensated for by reducing the amount of the two first ingredients slightly.

*Table I*

| Col. 1 Shell No. | Col. 2 $n$ | Col. 3 $r$ | Col. 4 Avg. $n$ | Col. 5 vol., cu. in. | Col. 6 Wt. of Foam, grams | Col. 7 Wt. of Liquid binder, grams | Col. 8 Wt. of TiO$_2$, grams |
|---|---|---|---|---|---|---|---|
| 0 | 1.41 | 0 | | | | | |
| 1 | 1.35 | 2.55 | 1.38 | 69.5 | 45 | 153 | 258 |
| 2 | 1.29 | 3.45 | 1.32 | 103 | 71.5 | 227 | 315 |
| 3 | 1.24 | 4.06 | 1.265 | 108 | 75.2 | 238 | 277 |
| 4 | 1.19 | 4.56 | 1.215 | 117 | 81.5 | 258 | 224 |
| 5 | 1.14 | 5.02 | 1.165 | 132 | 92.0 | 290 | 181 |
| 6 | 1.09 | 5.43 | 1.115 | 141 | 98.2 | 310 | 115 |
| 7 | 1.04 | 5.75 | 1.065 | 126 | 87.7 | 277 | 34 |
| 8 | 1.00 | 6.00 | 1.02 | 109 | 76.9 | 240 | 0 |

It will thus be apparent that by use of a low loss dielectric material the composition of which may readily be accurately controled by mechanical proportioning and mixing of the ingredients, the index-of-refraction or dielectric constant of batches of such material may be definitely established, and these batches may be used in the production of a globular shelled or layered microwave lens having the desired characteristics of the "Luneberg" lens by relatively simple fabrication techniques, a representative and practically proven example of which will now be given, having reference particularly to Figs. 3 and 4 of the drawing.

First, the spherical lens to be produced will be envisaged as formed from a plurality of segments having their apices at the center of the sphere, and then these segments are separately formed in layers from batches of the dielectric plastic which have the proper, controlled, indices-of-refraction and volume for the several individual layers in accordance with the formula $$n = 1 + K_a D_a + K_b D_b + K_c D_c$$

hereinbefore explained.

Although any one of various segmental divisions of the sphere may be chosen for the fabrication of the spherical lens, such as octants, quadrants, hemispheres and the like, it was found in actual practice, in the fabrication of a sphere of 12" diameter, having eight layers or shells to satisfy the variation in index-of-refraction from 1 to $\sqrt{2}$, that a division of the sphere into quadrants was practical from the standpoint of ease in molding, handling and ultimate assembly.

Using four suitable corner-forming molds 10 (Fig. 3) having the inner faces 11 and 12 of their sides in dimensional arrangement exactly conforming to the arrangement of corresponding planes intersecting the sphere, and eight templates 13 (Fig. 4) each having a curved edge 14 which is a half-circle arc of a radius equal to the calculated outer radius of a particular layer or shell, and a side edge 15 to be abutted against a gauge block or stop 16 of the mold, the prepared plastic material for the first, or center, layer or shell is packed into the corner angle of each mold and its exposed surface worked or trowelled with the arcuate edge 14 of the appropriate template, while the side edge 15 of the template is held against the stop 16 of the mold, to finish it as a spherical surface of the proper radius. Then the prepared plastic for the second layer or shell is packed into the mold upon the finished and sufficiently set first layer and worked or trowelled with the template for the second shell, and so on until all eight of the layers or shells have been formed step-by-step, it being appreciated that the previously formed spherical surface of each layer or shell provides a molding surface for the next outer layer or shell. In view of the fact that the templates 13 are so formed that the centers of their arcuate edges 14 are all equidistant from their gauging side edges 15 (Fig. 4), the successively formed shells will be concentric.

When these quadrants have been finished they are placed in an oven at approximately 170° F. to promote cure of the binder and to remove any residual moisture which, if it remained in the lens, would cause excessive functional losses.

After curing, the quadrants are assembled into a sphere and preferably enclosed in a radome comprising two thin hemispherical shells 17 and 18 joined at the equator by a belt 19 which overlaps the joint between them. A radome which has been found to be suitable is formed from a single layer of glass cloth impregnated with polyester resin. The primary functions of this radome are to provide protection against the weather and, to some extent, to guard against mechanical damage. It does not appreciably impair the electrical properties of the lens.

It will be understood that this example of fabricating an eight layer or shell, twelve inch diameter, lens, formed in quadrants, is merely representative, as other sizes and divisions may be chosen with appropriate modifications of the molds and templates therefor.

Due to the method of fabrication the trowelled surface of each of the layers or shells is of a somewhat rough or knobby character and there is therefore no sharp break or discontinuity in index-of-refraction as a function of the radius. This is desirable for obtaining a better realization of the (continuous) "Luneberg" law and for reducing internal reflections.

A microwave lens of this type has many advantages and a variety of uses. Owing to its spherical symmetry there is no inherent limitation on the size of the angle through which the beam may be scanned by moving the feed. Scanning through 360° without distortion of the beam may be accomplished simply by moving the feed along a great circle. Multiple feeds may be used on the same or different wavelengths to provide multilobe scanning. Since only the feed and not the entire lens is moved, tracking and scanning may be accomplished more rapidly and with less power than with conventional antenna systems. In other words, in its application to radar this spherical lens has advantages over known antenna systems where wide angle scanning with one or more lobes or rapid tracking or scanning is required. Moreover, for antenna systems with apertures on the order of two feet or less, the use of this lens will afford a saving in weight.

Various changes and modifications, particularly in the physical structure and method of fabrication of the lens, are considered to be within the principle of the invention and the scope of the following claims.

What I claim is:

1. A device for focusing radio waves from incident plane phase fronts lying in any plane, comprising a spherical body symmetrical with respect to its center and being composed of concentric shell-like spherical layers of dielectric material in such a manner that the index of refraction of these layers stepwise radially of the sphere approximates the "Luneberg" equation $n=\sqrt{2-R^2}$ where R is the ratio of the radial distance to a point in said sphere to the maximum radial distance; said dielectric material being composed of a mixture of a stable expanded dielectric plastic substance, and a dispersible dielectric substance.

2. A device as claimed in claim 1, in which the mixture of the stable dielectric substance and the dispersible dielectric substance has an index-of-refraction $n$ controlled in accordance with the equation $$n=1+K_aD_a+K_cD_c$$

where $K_a$ is the value of the stable dielectric substance in units of cubic inches per gram and $D_a$ its density in grams per cubic inch, and $K_c$ is the value of the dispersible dielectric substance in units of cubic inches per gram and $D_c$ its density in grams per cubic inch.

3. A device as claimed in claim 1, in which the stable expanded dielectric plastic substance is of low dielectric constant, and the dispersible dielectric substance is of high dielectric constant.

4. A device as claimed in claim 1, in which the ratio of dispersible dielectric substance to stable expanded dielectric plastic substance varies stepwise radially of the sphere in the layers from the center of the sphere in order to maintain throughout the layers a practical approximation of the dielectric constant represented by the "Luneberg" equation.

5. A device as claimed in claim 1, in which the stable expanded dielectric substance is ground polystyrene foam.

6. A device as claimed in claim 1, in which the dielectric material includes also a binder.

7. A device as claimed in claim 6, in which the mixture of the stable dielectric substance, the dispersible dielectric substance and the binder has an index-of-refraction $n$ controlled in accordance with the equation $$n=1+K_aD_a+K_bD_b+K_cD_c$$

where $K_a$ is the value of the stable dielectric substance in units of cubic inches per gram and $D_a$ its density in grams per cubic inch, $K_b$ is the value of the binder in units of cubic inches per gram and $D_b$ its density in grams per cubic inch, and $K_c$ is the value of the dispersible dielectric substance in units of cubic inches per gram and $D_c$ its density in grams per cubic inch.

8. A device as claimed in claim 1, in which the dispersible dielectric substance is titanium dioxide.

9. A device as claimed in claim 1, in which the dispersible dielectric substance is lead chloride.

10. A device as claimed in claim 6, in which the binder is a polyvinyl acetate emulsion.

11. A device as claimed in claim 7, in which the stable dielectric substance, the binder, and the dispersible dielectric substance are, respectively, ground polystyrene foam, polyvinyl acetate emulsion, and titanium dioxide.

12. A device as claimed in claim 7, in which the stable dielectric substance, the binder, and the dispersible dielectric substance are, respectively, ground polystyrene foam, polyvinyl acetate emulsion, and lead chloride.

13. A device as claimed in claim 1, in which the sphere includes, in full spherical complement, a plurality of similar, individual segments each comprising a plurality of nested shell-like spherically contoured layers the characteristics of each of which are responsive to the said "Luneberg" equation, said segments being assembled together to produce an operative spherical whole.

14. The method of fabricating a spherical microwave lens embodying an approximation of the index-of-refraction represented by the "Luneberg" equation $n=\sqrt{2-R^2}$, where R is the ratio of the radial distance to a point in said sphere to the maximum radial distance, in a plurality of globular shells, which includes the step of individually forming said shells in an arrangement of nested layers of successively increasing radius from a plastic dielectric material comprising combined substances of differing indices-of-refraction, whereby the several shells are so produced that their indices-of-refraction will differ radially of the spherical lens and thereby conform in the lens to the said "Luneberg" equation.

15. The method as claimed in claim 14, in which similar segments of said sphere are separately produced in number adequate to furnish the full segmental complement of the sphere, the several segments being ultimately united in full sphere-forming assembly.

16. The method as claimed in claim 15, in which each of said layers is formed by depositing a batch of its plastic so confined as to be retained substantially in wedge shape with one surface exposed, working said exposed surface to segmental spherical form upon a radius appropriate to the particular layer, depositing upon such worked face another similarly confined batch of plastic suitable for the next adjacent layer, working the exposed surface of said last-named batch to segmental spherical form upon a radius appropriate to its respective layer, and continuing this layer-by-layer fabricating process until the full complement of layers of said sphere are fabricated.

17. The method as claimed in claim 16, in which the working of successive layer batches to provide their segmental spherical surfaces produces minutely roughened contours which serve to eliminate sharp surface breaks between adjacent layers and discontinuity in the index-of-refraction as a function of their radii.

References Cited in the file of this patent

UNITED STATES PATENTS 2,761,141     Strandberg et al. _____ Aug. 28, 1956

OTHER REFERENCES

"Three Dimensional Microwave Lens," by G. P. Robinson, Tele-Tech and Electronic Industries, November 1954, page 73.